United States Patent Office 3,496,720
Patented Feb. 24, 1970

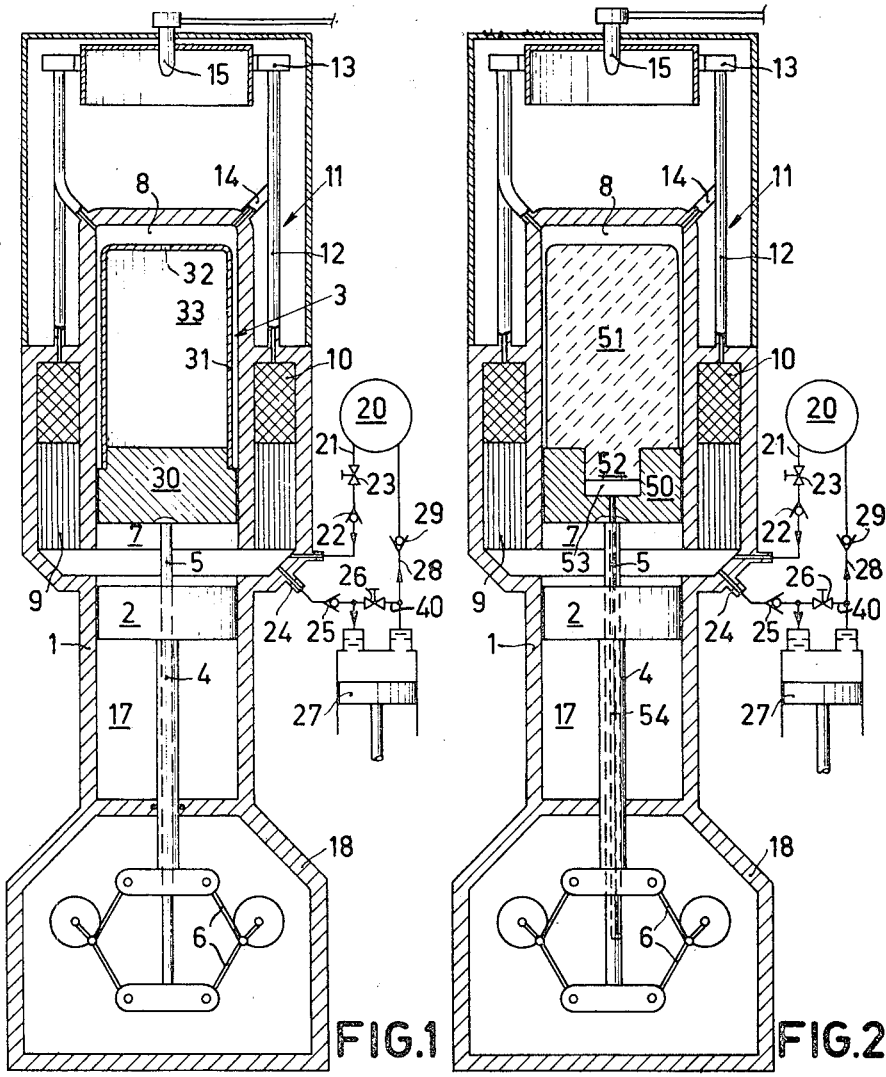
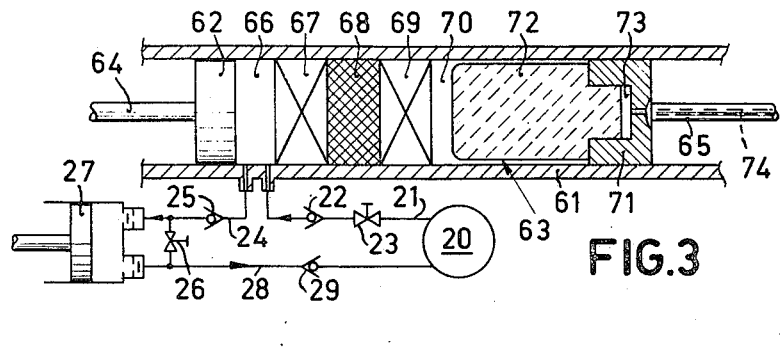
FIG.1 FIG.2 FIG.3
INVENTORS
GREGORIUS TH.M. NEELEN
ROELF JAN MEIJER

3,496,720
HOT-GAS ENGINE WITH SOLID CAP ON EXPANSION PISTON
Gregorius Theodorus Maria Neelen and Roelf Jan Meijer, Emmasingel, Eindhoven, Netherlands, assignors, by mesne assignments, to U.S. Philips Corporation, New York, N.Y., a corporation of Delaware
Filed Feb. 5, 1968, Ser. No. 702,928
Claims priority, application Netherlands, Feb. 25, 1967, 6703011
Int. Cl. F03g 7/06; F25b 9/00; F01k 27/00
U.S. Cl. 60—24                                              8 Claims

ABSTRACT OF THE DISCLOSURE

A hot-gas engine of the displacer type wherein the displacer has a heat-insulating cap formed of a substantially solid material, such as quartz or ceramic glass or sintered metal, which has relatively high melting temperature, low specific gravity, and low thermal conductivity.

---

The invention relates to a hot-gas engine which comprises a working space containing a working medium and which is subdivided by a regenerator in a compression space having a lower average temperature and an expansion space having a higher average temperature, the volume of each of these spaces being adapted to be varied by piston-like bodies reciprocating with mutual phase differences in such manner that during expansion the working medium is substantially in the expansion space and during compression the working medium is substantially in the compression space, the engine comprising a power control device which, by withdrawing working medium from or supplying working medium to the working space, can vary the average pressure level in said space, the piston-like body which bounds the expansion space being provided with a heat-insulating piston cap on its side facing the said space.

Hot-gas engines of the type to which the present invention relates are known. In these engines a working medium in a closed working space is alternately compressed when it is substantially in the compression space of lower average temperature, is then transported to the expansion space through a regenerator, in which the working medium absorbs thermal energy from the regenerator mass, after which, when the working medium is substantially in the expansion space of higher average temperature, it is expanded and then transported back to the compression space again through the regenerator.

Structurally, there is to be discriminated between hot-gas engines of the displacer type and hot-gas engines of the two-piston-type. In hot-gas engines of the displacer type a piston ensures the alternate compression and expansion of the working medium while a displacer ensures the transport of the medium from the compression space to the expansion space, and conversely. In hot-gas engines of the two-piston-type, both a compression piston and an expansion piston are provided which in cooperation both ensure the compression, transportation and expansion.

In these hot-gas engines caloric energy supplied to the expansion space through a burner is converted into mechanical energy. The power supplied by these engines is proportional to the average pressure in the working space. This provides the possibility of controlling the power by conducting away working medium from the working space or supplying working medium to the working space through a control device.

As already stated above, thermal energy is supplied to these engines through a burner. The temperature of the medium in the expansion space may be 600 to 700° C. For the efficiency of the hot-gas engine it is of importance that said thermal energy cannot leak away to the atmosphere or to the compression space through the piston-like body (piston or displacer) which bounds the said expansion space. In order to prevent this it is known to provide the piston-like body (piston or displacer) with a heat-insulating hollow metal piston cap. With a view to the thermal conductivity through the walls of the said cap it is desirable to construct said cap as thin as possible. Since the pressures in these hot-gas engines may be very high (for example, minimum pressure 70 atm. and maximum pressure 140 atm.) one or more capillary apertures are provided in the wall of the cap so that the average pressure will always adjust in the cap. As a result of this the pressure differential across the walls of the cap is as small as possible so that the walls can be constructed as thin as possible. A drawback is that the capillary apertures always give rise to some loss of power. A further drawback of said construction is that the mass of medium in the cap has a delaying influence on the control speed of the hot-gas engine. If the power of the hot-gas engine is controlled downwards by the control device, not only medium must be conducted away from the working space itself but also from the cap. This means that more medium must be conducted away than corresponds to the quantity of medium in the working space itself. The same drawback occurs in controlling upwards the engine. In this case more medium must be supplied in order to bring the pressure also in the cap at level. So in controlling, the hollow displacer cap constitutes a volume-increasing factor.

In order to avoid the said drawback the invention is based on the recognition of using a closed cap. The first idea was to construct the so far commonly used metal walls so thick that the cap is strong enough to withstand the pressures occurring. However, this leads to very thick walls which produce too much thermal conductivity and large inertia forces which is a drawback for the driving mechanism and balancing.

The object of the invention is to avoid the above-mentioned drawbacks and to provide a hot-gas engine in which the thermal losses through the piston are small, the gravitational forces are low and the control speed is high.

The hot-gas engine according to the invention very readily meets these requirements and is characterized in that the said piston cap has such a compression strength that cavities possibly present in the piston cap are sealed from the working space, the piston cap being manufactured from an opaque vitreous or sintered material having a melting temperature which is higher than the temperature prevailing in the expansion space and having a specific gravity which is low relative to metals having the same or higher melting temperatures and a poor thermal conductivity. In a favourable embodiment the piston cap is substantially solid.

Because the cap according to the invention is resistant to compression there will be less medium in the hot-gas engine than in the known hot-gas engines so that the control speed can be large.

Vitreous or sintered materials are poor heat conductors so that a good heat insulation is obtained, no thermal losses occurring by radiation because the material is opaque.

A further advantage of vitreous or sintered material is that it has a low specific gravity as compared with metals so that the total weight can be low and no inadmissible gravitational forces occur.

The melting point of vitreous and sintered materials is very high so that a high temperature is admissible in the expansion space, which is favourable for the overall efficiency of the hot-gas engine.

Vitreous and also sintered materials have the further advantage of being non-porous so that no medium can penetrate and in addition these materials are dust-free which is of great importance in particular in hot-gas engines since dust causes regenerator pollution.

A further advantage of vitreous and sintered materials is a low coefficient of expansion, this in connection with the fact that a temperature gradient prevails across the said cap of 700° on the expansion space side to approximately room temperature on the side of the piston-like body. As a result of the low coefficient of expansion the piston cap may now be given a cylindrical construction without the danger existing that the cap is jammed in the cylinder as a result of expansion at the temperatures prevailing during operation.

In a further favourable embodiment of the hot-gas engine according to the invention, the piston cap is manufactured from quartz glass with gas inclusions. These gas inclusions first of all have the advantage that they render the quartz glass opaque while in addition they apparently reduce the specific gravity of the quartz glass which results in an overall reduction of weight.

A further embodiment of the hot-gas engine according to the invention is characterized in that the piston cap is manufactured from a glass-ceramic material. This vitreous ceramic material has the advantage of a very high mechanical and thermal shock resistance and a very high melting point. In addition, this glass-ceramic material has a very low coefficient of expansion.

In the scope of the present invention glass-ceramic material is to be understood to mean a material which is obtained from a vitreous material by a thermal treatment, which treatment results in a finely disperse separation of a crystalline phase occurring and ultimately resulting in a material which consists of that finely disperse crystalline material surrounded by a vitreous phase.

A further favourable embodiment of the hot-gas engine according to the invention is characterized in that the piston cap is secured to the piston-like body in question in such manner that a sealed space is present between the piston and the piston-like body which space communicates with a space in which a pressure prevails which is lower than the minimum pressure occurring in the working space. In this construction the piston cap is always forced against the piston-like body by the pressure prevailing in the working space. As a result of this the connection between the piston cap and the piston is never subjected to tensile stress which is extremely favourable in connection with the material.

In a further embodiment the said piston cap on its side facing the piston-like body comprises a part having a smaller diameter which is screw-threaded at its outer circumference, said part being screwed in a recess in the piston-like body provided with internal screw thread, a duct communicating with the said recess at the bottom and opening with its one end in a space in which a pressure prevails which is lower than the minimum pressure which occurs in the working space.

In order that the invention may be readily carried into effect, a few embodiments thereof will now be described in greater detail, by way of example, with reference to the accompanying drawing, in which FIGURE 1 diagrammatically shows not to scale a known hot-gas engine of the displacer type in which the displacer cap is hollow.

FIGURES 2 and 3 diagrammatically show not to scale a hot-gas engine of the displacer type and a hot-gas engine of the two-piston-type, respectively, in which the displacer cap and the piston cap, respectively, are solid.

Referring now to FIGURE 1, reference numeral 1 denotes a cylinder in which a piston 2 and a displacer 3 reciprocate. The piston 2 and the displacer 3 are connected, through a piston rod 4 and a displacer rod 5, respectively, to a rhombic driving mechanism 6, the construction of which is assumed to be known. Between the piston 2 and the displacer 3 there is a compression space 7 while above the displacer 3 there is an expansion space 8. The compression space 7 and the expansion space 8 communicate with each other through a cooler 9, a regenerator 10 and a heater 11 which comprises a number of ducts 12 which communicate at one end with the regenerator 10 and at the other end with an annular duct 13 and a number of ducts 14 which communicate at one end with the annular duct 13 and at the other end with the expansion space 8. By means of the heater 11, thermal energy is supplied to the hot-gas engine through a burner 15. In the working space constituted by the expansion space 8 and the compression space 7 with the intermediately located communication ducts, a working medium, for example, helium under a high pressure, is available. The maximum pressure lies in the order of 140 atm. with a pressure ratio of 2. Below the piston 2 there is a buffer space 17 containing the same medium as the working space but under an average pressure of 105 atm. In the sump 18 in which the rhombic driving mechanism is provided, atmospheric pressure prevails. The hot-gas engine further comprises a control device with which the average pressure level in the hot-gas engine can be varied. This device comprises a storage container 20 containing medium under a pressure which is higher than the maximum pressure which prevails in the working space. This storage container 20 communicates with the compression space 7 through a medium supply duct 21 in which a check valve 22 and a controllable cock 23 are arranged. Furthermore a medium outlet duct 24 containing a check valve 25 communicates with the compression space 7. The medium outlet duct 24 communicates with a compression device 27, the outlet 28 of the compression device communicating with the container 20 through a check valve 29. The outlet ducts 24 and 28 communicate with each other through a duct 40 comprising a controllable cock 26. By opening the controllable cock 23 medium is supplied to the working space, while by closing the cock 26 the compressor 27 will start withdrawing working medium from the working space. The actuation of the cocks 23 and 26 may be effected for example, by a governor which operates the cocks 23 and 26 in accordance with the number of revolutions of the hot-gas engine. The displacer 3 is constituted by a piston 30 which comprises a displacer cap 31 on its side facing the expansion space 8. The displacer cap 31 is hollow and thin-walled, a capillary aperture 32 being provided in the metal wall through which the space 33 inside the piston cap 31 communicates with the expansion space 8 in such manner that average pressure which prevails in the space 8 will adjust in said space but that pressure variations which occur in the space 8 do substantially not occur in the space 33. As a result of this construction of the piston cap 31 an extremely good insulation of the expansion space relative to the piston 30 is obtained, in which as a result of the thin walls only little thermal energy will leak to the piston 31 by conduction while the displacer cap is very light as a result of its thin-walled construction so that only small gravitational forces occur. In addition to all these advantages the hollow displacer cap 31, however, has the great drawback that a large quantity of working medium is present therein under the average pressure which prevails in the working space. This means that in controlling the power of the hot-gas engine by varying the average pressure level, so by withdrawing medium from the working space by closing the cock 26 or by supplying working medium by opening the cock 23, the average pressure level in the hollow displacer cap 31 must also be adapted. In addition to the pressure in the working space constituted by the compression space 7 and the expansion space 8 and the intermediately located communications, the pressure in the additional space 33 also must consequently be varied which means that a comparatively large quantity of medium extra will have to be supplied or conducted away. This renders the control slow which may be a great drawback in circumstances.

In order to avoid this drawback the hot-gas engine shown in FIGURE 2 which, as regards construction, is quite similar to the hot-gas engine shown in FIGURE 1, comprises a displacer which is constituted by a piston 50 and a solid displacer cap 51 of vitreous ceramic material connected thereto. This has the great advantage that now a much smaller quantity of medium is present in the working space of the hot-gas engine, so that withdrawal or supply of a small quantity of medium produces already a large variation of the value of the average pressure. This means that the control will be considerably more rapid than in the hot-gas engine shown in FIGURE 1. The displacer cap 51 of glass-ceramic material has good insulating properties as a result of the poor thermal conductivity of said material, while the specific gravity of said material is comparatively low, so that comparatively small gravitational forces will occur. Furthermore the glass-ceramic material is opaque so that also by radiation from the expansion space 8 little thermal energy will reach the piston 50. The glass-ceramic material from which the displacer cap 51 is manufactured has a very low coefficient of thermal expansion so that the displacer cap can be made purely cylindrical without the danger existing that said cap will be deformed by thermal expansion in such manner as to jam in the cylinder 1. The connection between the displacer cap 51 and the piston 50 is obtained by giving a part 53 of the displacer cap a smaller diameter and providing said part with external screw thread, which part is then screwed in a recess 53 in the piston 50 which is provided with internal screw thread. At the bottom of the recess 53 a duct 54 empties which extends through the displacer rod to the sump 18 in which atmospheric pressure prevails. This means that atmospheric pressure will also prevail in the recess 53 so that the displacer cap will always be forced positively against the piston 50 as a result of the pressure which prevails in the expansion space 8. This means that the connection of the piston cap 51 to the piston 50 will never be subjected to tensile stresses.

FIGURE 3 shows a hot-gas engine of the two-piston-type. This engine comprises a cylinder 61 in which a compression piston 62 and an expansion piston 63 reciprocate as a result of the action of a driving mechanism now shown to which they are connected through piston rods 64 and 65. Between the surfaces of the pistons 62 and 63 facing each other there is a compression space 66, a cooler 67, a regenerator 68, a heater 69 and an expansion space 70. The expansion piston 63 is constituted by a piston part 71 and a piston cap 72 which is manufactured from a glass ceramic material and insulates the piston part 71 from the expansion space 70. The construction of the expansion piston 63 entirely corresponds to that of the displacer 51, 50 shown in FIGURE 2, in which again the recess 73 between the expansion piston cap 72 and the piston 71 communicates, through a duct 74, with the sump which is at atmospheric pressure so that in this construction also it is achieved again that the piston cap 72 is positively forced against the piston part 71 as a result of the pressure which prevails in the expansion space 72 so that the connection is never subjected to tensile stresses.

From the above it is apparent that, as a result of the use of a solid displacer cap and expansion piston cap, respectively, it is reached that, whereas the insulating properties of the solid displacer cap and piston cap, respectively, manufactured from a vitreous ceramic material are comparable with those of the hollow piston cap used in the hot-gas engine shown in FIGURE 1, and the gravitational forces of the solid piston cap and displacer cap, respectively, are only little larger than those of the hollow piston cap shown in FIGURE 1, the control speed of the hot-gas engine shown in FIGURES 2 and 3 is considerably larger than that of the hot-gas engine shown in FIGURE 1.

Instead of from a glass-ceramic material, the piston cap may alternatively be manufactured, for example, from quartz glass having air inclusions or from a sintered material, for example, sintered metal, or a ceramic material.

Although in the embodiments given by way of example the displacer cap and piston cap, respectively, are solid, it is possible in circumstances, for example, in the case of large diameters, to provide one or more cavities in said cap. In that case the walls must, of course, be resistant to compression, that is to say they must be capable of withstanding the compression forces occurring.

What is claimed is:

1. In a hot-gas engine having within a housing a closed working space which includes separate compression and expansion spaces operable at higher and lower average temperatures respectively, a regenerator disposed between said spaces, a working medium flowable through said regenerator between said spaces, compression and expansion pistons reciprocally movable in the corresponding compression and expansion spaces at a mutual phase difference for varying the volumes of said spaces, whereby there is expansion and compression of the working medium while the medium is substantially in the corresponding spaces, and a power control device for selectively withdrawing from and supplying to the working space, working medium to vary the average pressure in said space, the improvement in combination therewith, comprising a substantially solid cap secured to the end of the expansion piston bounding the expansion space, the cap being made of a material that has a melting temperature higher than said higher average expansion space temperature, and a specific gravity that is low relative to metals having melting temperatures at least as high as said higher average expansion space temperature.

2. An engine as defined in claim 1 wherein said cap material has relatively low thermal conductivity relative to metals having melting temperatures at least as high as said higher average expansion space temperature.

3. An engine as defined in claim 1 wherein at least one of said cap and expansion piston elements has a cavity on a portion of one element adjacent the other element, thus defining a sealed space therebetween, the apparatus further comprises a remote part of the engine where pressure is maintained at a level lower than the minimum pressure in said working space, and duct means interconnecting said sealed space and said remote part, whereby pressure external the cap is always greater than the pressure between said cap and piston elements.

4. An engine as defined in claim 3 further comprising threaded fastener means formed on the adjacent parts of said cap and expansion piston means, rendering said elements releasably engaged.

5. An engine as defined in claim 1 wherein the material of said cap is glass quartz, or glass quartz with air inclusions, or glass-ceramic, or sintered metal, or vitreous material.

6. An engine as defined in claim 5 wherein said material is opaque.

7. An engine as defined in claim 1 wherein said pistons are disposed in spaced parts of a cylindrical housing with the compression and expansion spaces and regenerator between the pistons.

8. An engine as defined in claim 1 wherein said pistons are disposed in spaced parts of a cylindrical housing with the compression space disposed between adjacent parts of the two pistons, and the expansion space between a remote part of the expansion piston and said housing.

(References on following page)

References Cited

UNITED STATES PATENTS

| | | | |
|---|---|---|---|
| 1,073,065 | 9/1913 | Anderson et al. | 60—24 |
| 1,240,862 | 9/1917 | Lundgaard | 62—6 |
| 1,751,350 | 3/1930 | Moyer et al. | 92—248 |
| 1,904,070 | 4/1933 | Morgan | 92—248 XR |
| 2,413,751 | 1/1947 | Dennis | 92—248 XR |

FOREIGN PATENTS 18,627  6/1907  Great Britain.

MARTIN P. SCHWADRON, Primary Examiner

R. R. BUNEVICH, Assistant Examiner

U.S. Cl. X.R.

62—6